N. H. MEAD.
Tire Tightener.
No. 79,999.
Patented July 14, 1868.
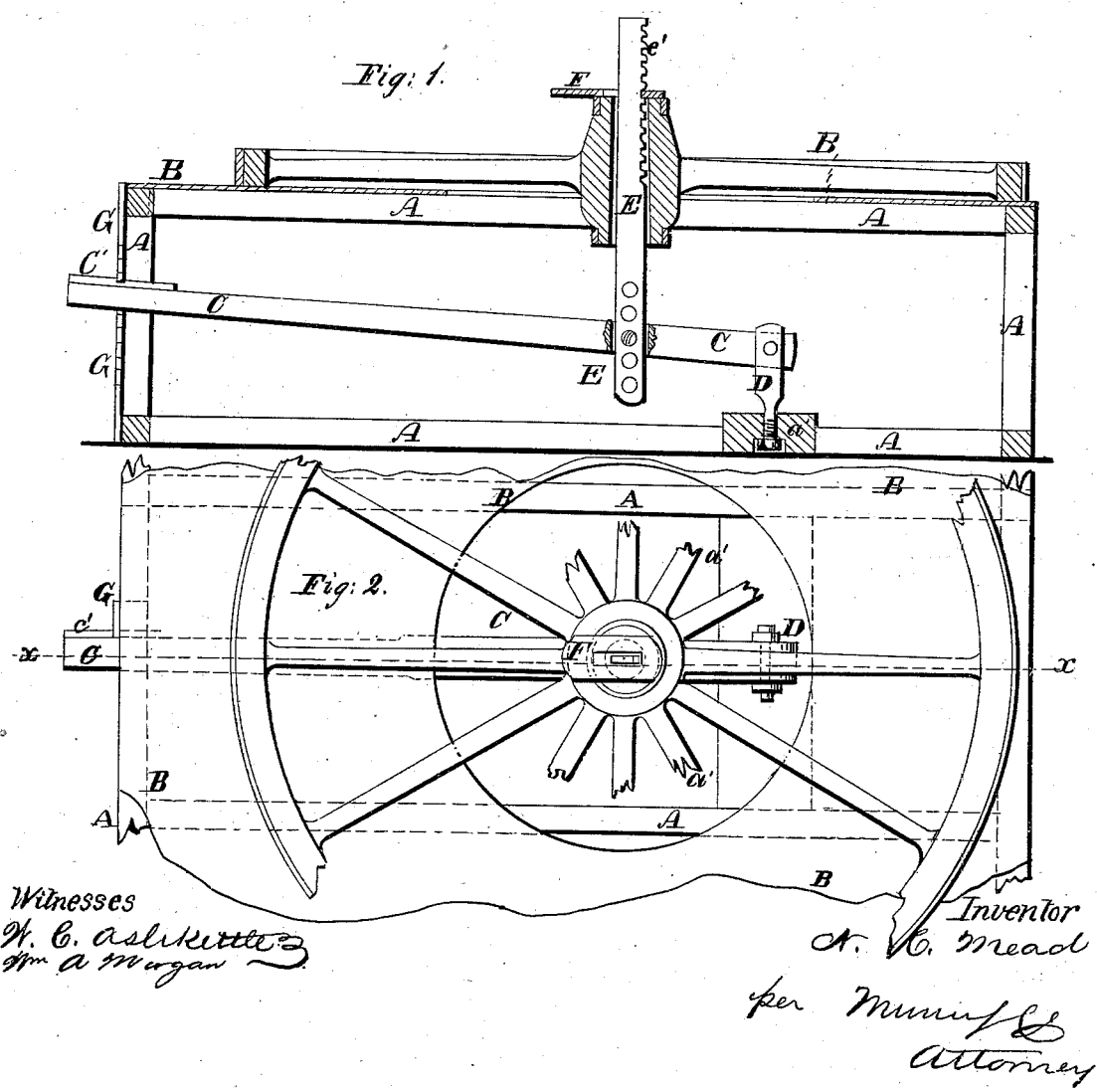

United States Patent Office.

N. H. MEAD, OF WATERPORT, NEW YORK.

Letters Patent No. 79,999, dated July 14, 1868.

IMPROVEMENT IN TIRE-FRAME ATTACHMENT.

The Schedule referred to in these Letters Patent and making part of the same.

TO ALL WHOM IT MAY CONCERN:

Be it known that I, N. H. MEAD, of Waterport, in the county of Orleans, and State of New York, have invented a new and improved Tire-Frame Attachment; and I do hereby declare that the following is a full, clear, and exact description thereof, which will enable others skilled in the art to make and use the same, reference being had to the accompanying drawings, forming part of this specification.

Figure 1 is a vertical section of my improved machine, taken through the line $x\ x$, fig. 2.

Figure 2 is a partial top view of the same.

Similar letters of reference indicate corresponding parts.

My invention has for its object to improve the construction of tire-frames, so as to make them more convenient and effective in operation, and which will enable the wheel to be detached and turned, when required, before the tire can get cold; and it consists in the construction and combination of the operating parts, as hereinafter more fully described.

A is the wooden framework of the machine, which may be made of any desired form, and the top of which should be protected with a metallic plate or plates, B, to prevent the hot tire from burning the wood-work of the said frame A.

C is a lever, the inner end of which is pivoted to the eyes of an eye-bolt, D, or other suitable support, attached to the cross-bar $a'$ of the frame A.

E is a bar, the lower end of which passes through and is pivoted to the lever C by a pin passing through the said lever, and through one or the other of the holes formed through the said lower part of the said bar E, as shown in fig. 1.

Upon one edge of the upper part of the bar E is formed a series of teeth, $e'$, to take hold of the slotted cap-plate F, to clamp the wheel to the frame A.

To the forward part of the lever C is attached a plate, $c'$, the edge of which is formed and projects in such a way as to take hold of the teeth of the ratchet-bar G, attached to the frame A, so as to hold the said lever securely at any point to which it may be lowered, clamping the wheel with any desired firmness.

This construction enables the wheel to be detached and turned, when required, almost instantly, before the tire can become cold.

It also enables the operator, by simply bringing the lever $c$ to the same notch of the rack G, to give all the wheels the same dish.

I claim as new, and desire to secure by Letters Patent—

The combination of the pivoted lever C, adjustable toothed bar E, slotted cap-plate F, and toothed bar G, with each other and with the frame A, substantially as herein shown and described, and for the purpose set forth.

N. H. MEAD.

Witnesses:
ALFRED H. WELCH,
TRUMAN BATEMAN.